United States Patent [19]

Furuya et al.

[11] Patent Number: 4,985,312
[45] Date of Patent: Jan. 15, 1991

[54] HEAT REFLECTING GLASS PLATE WITH MULTILAYER COATING

[75] Inventors: Koichi Furuya; Hiroshi Nakashima; Yasunobu Iida, all of Matsusaka; Nobuyuki Takeuchi, Ise; Masato Nakamura, Mie, all of Japan

[73] Assignee: Central Glass Company, Limited, Ube, Japan

[21] Appl. No.: 444,717

[22] Filed: Dec. 1, 1989

[30] Foreign Application Priority Data

Dec. 13, 1988 [JP] Japan .................. 63-314716

[51] Int. Cl.5 .............................. B32B 17/06
[52] U.S. Cl. ...................... 428/627; 428/630; 428/632; 428/658; 428/673
[58] Field of Search ............... 428/623, 627, 630, 632, 428/658, 673, 674

[56] References Cited

U.S. PATENT DOCUMENTS 4,883,721  11/1989  Nalepka et al. .............. 428/673
4,898,789  2/1990   Finley ....................... 428/673

FOREIGN PATENT DOCUMENTS 59-165001  9/1984  Japan .
62-41740   2/1987  Japan .
62-37051   3/1987  Japan .
62-37052   3/1987  Japan .
63-183164  7/1988  Japan .

Primary Examiner—W. Dean
Assistant Examiner—George Wyszomierski
Attorney, Agent, or Firm—Fleit, Jacobson, Cohn, Price, Holman & Stern

[57] ABSTRACT

The invention provides a heat reflecting glass plate with a multilayer coating on a transparent glass plate. The multilayer coating comprises a film of indium-tin oxide (ITO) of AlN deposited on the glass surface, a heat reflective film of Ag or Cu deposited on the ITO or AlN film to a thickness of 40–200 Å, a metal Zn film deposited on the Ag or Cu film to a thickness of 20–200 Å and an ITO or AlN film as the outermost layer. The multilayer coating may further comprise at least one set of the Ag or Cu film, metal Zn film and ITO or AlN film such that each Ag or Cu film overlies an ITO or AlN film and is overlaid with a metal Zn film and that the outermost layer is an ITO or AlN film. The multilayer coating is excellent in the fundamental characteristics as a heat reflecting and transparent coating and also in moisture resistance.

11 Claims, 1 Drawing Sheet

HEAT REFLECTING GLASS PLATE WITH MULTILAYER COATING

BACKGROUND OF THE INVENTION

This invention relates to a heat reflecting glass plate for use in buildings or vehicles to shut out exterior heat and prevent transfer of interior heat to the exterior, and more particularly to a glass plate having a heat reflecting multilayer coating which includes at least one layer of silver or copper. The heat reflecting glass plate can be used as a laminated glass or an insulated glass.

In conventional heat reflecting glass plates it is prevailing to use a coating film of silver which is high in infrared reflectance. However, a silver film is relatively low in durability and wear resistance and also in transmittance for visible light. Therefore, it is usual to form a multilayer coating by providing a transparent metal or metal oxide film on each side of a silver film.

For example, JA-A No. 62-41740 shows a heat reflecting three-layer coating in which a Ag film overlies a ZnO film and is overlaid with another ZnO film. Further, there are proposals of more intricated multilayer coatings. JP-A No. 59-165001 shows a four-layer coating consisting of an indium-tin oxide (ITO) film deposited on a glass surface, an Ag film on the oxide film, a film of a fully oxidized metal selected from Al, Ti, Ta, Cr, Mn and Zr on the Ag film and another ITO film as the outermost layer. JP-A No. 63-183164 shows a four-layer coating consisting of a transparent Zn-Sn alloy film deposited on a glass surface, a Ag film on the alloy film, a film of a metal selected from Ti, Zr, Cr and Zn-Sn alloy on the Ag film and a $TiO_2$ film as the outermost layer. JP-UM-A No. 62-37052 shows a four-layer coating consisting of a ZnO or ITO film deposited on a glass surface, a Ag or Cu film on the oxide film, a film of a metal selected from Al, Ti, Ni, Zn, Cr and their alloys on the Ag or Cu film and a ZnO or ITO film as the outermost layer, on condition that at least one of the inner and outer oxide films is insufficient in the degree of oxidation. JP-UM-A No. 62-37051 shows a five-layer coating consisting of a ZnO or ITO film on a glass surface, an Al or Zn film on the oxide film, a Ag or Cu film on the al or Zn film, another Al or Zn film on the Ag or Cu film and another ZnO or ITO film as the outermost layer.

However, these heat reflecting multilayer coatings are still unsatisfactory particularly in moisture resistance. Under high-temperature and high-humidity conditions experienced in summer the silver film in the multilayer coatings is liable to undergo agglomerative oxidation by the influence of moisture to result in appearance of spot-like defects. It is inevitable that the transparent oxide films in the multilayer coating is permeable to moisture to some extent. Even in the case of a multilayer coating including a metal film such as Al or Zn film as a barrier layer, it is likely that the barrier effect diminishes by oxidation of the metal film itself. Of course it is impermissible to make the barrier metal film very thick because of lowering of transmittance of the coating for visible light.

SUMMARY OF THE INVENTION

It is an object of the present invention to provide a heat reflecting glass plate with a multilayer coating which includes a silver or copper film as the heat reflecting component and is excellent not only in optical characteristics and heat reflecting capability but also in moisture resistance.

According to the invention there is provided a heat reflecting glass plate having a heat reflecting multilayer coating on one side of a transparent glass plate, the multilayer coating comprising a base layer which is a film of indium-tin oxide (ITO) or aluminum nitride AlN deposited on the glass surface, a heat reflecting layer which is a film of Ag or Cu and deposited on the base layer and has a thickness in the range from 40 to 200 Å, a barrier metal layer which is a metal Zn film deposited on the Ag or Cu film and has a thickness in the range from 20 to 200 Å and an outer protective layer which is a film of ITO or AlN deposited on the metal Zn film.

A multilayer coating according to the invention may further comprise at least one set of the above stated heat reflecting layer of Ag or Cu, metal Zn layer and outer protective layer of ITO or AlN such that each Ag or Cu layer ovelies an ITO or AlN layer and is overlaid with a metal Zn layer and that the outermost layer of the coating is an ITO or AlN layer.

In the present invention either Ag or Cu is employed as the heat reflecting material. The effectiveness of Ag is well known. Cu is nearly comparable to Ag in heat reflecting capability and is less costly.

An important feature of the invention is the provision of a metal Zn film of a strictly specified thickness in contact with the outer surface of the Ag or Cu film. Zn is employed mainly in view of its stronger ionization tendency than Ag and Cu. Such a Zn film well serves the purpose of preventing migration of Ag or Cu ions from the underlying heat reflecting film and permeation of moisture into the Ag or Cu film.

Either ITO or AlN is employed as the material of both the base layer and the outer protective layer on the metal Zn layer primarily because both ITO and AlN have good optical characteristics and protective capabilities. With respect to the outer protective layer, it is important not to oxidize the precedingly deposited metal Zn film in the operation to form the protective layer. If an oxide film is indeliberately deposited on a Zn film it is likely that the Zn film is oxidized to leave only a very thin region remotest from the outer surface unoxidized. In the case of an ITO film, the film can be formed without significantly oxidizing the Zn film, for example, by a DC sputtering method using a sintered target of $In_2O_3$ containing 5–10 wt % of $SnO_2$ in argon gas which may contain 0–4% of oxygen. In the case of an AlN film, the film can be formed by a sputtering method in an oxygen-free gas atmosphere so that the Zn film is not oxidized. In either case the thickness of the underlying metal Zn layer can accurately be controlled.

In this invention the transparent glass plate is either a colorless glass (so-called clear glass) plate or a colored glass plate. The glass is not necessarily an inorganic glass and may be a so-called organic or plastic glass such as polymethyl methacrylate. The glass plate may be either a flat plate or a curved plate, may be a reinforced or tempered glass plate, and may be a component of a laminated glass or an insulated glass.

In the practice of the present invention it is suitable to employ a four-layer coating, seven-layer coating or ten-layer coating.

A heat reflecting glass plate according to the invention is excellent in heat reflecting capability, low emissivity of heat and transmittance for visible light and also in moisture resistance even at relatively high temperatures.

DESCRIPTION OF THE PREFERRED EMBODIMENTS

Figure 1:
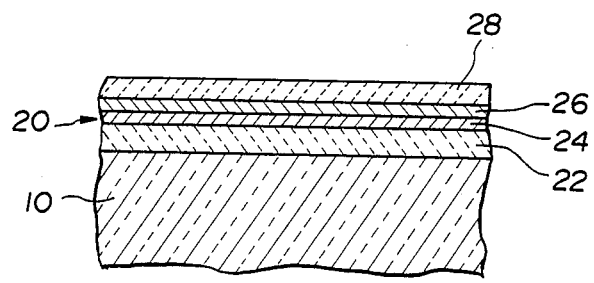
FIG. 1 is a fragmentary and explanatorily enlarged sectional view of a glass plate having a heat-reflective four-layer coating as an embodiment of the present invention.

FIG. 1 shows the simplest construction of the heat-reflective multilayer coating according to the invention. In this case the multilayer coating 20 is made up of an inner protective film 22 of either ITO or AlN deposited directly on one surface of a glass plate 10, a reflective metal film 24 of either Ag or Cu deposited on the protective film 22, a metallic Zn film 26 deposited on the reflective film 24 and an outer protective film 28 of either ITO or AlN overlying the Zn film 26.

The thickness of the ITO or AlN film 22 is not strictly limited, though usually it is suitable to deposit this film 22 to a thickness of from about 100 to about 1000 Å.

The thickness of the Ag or Cu film 24 is limited within the range from 40 to 200 Å. If this metal film 24 is made thinner than 40 Å the film 24 may not be uniform in thickness and, moreover, is insufficient and uneven in the heat-reflecting capability. When the thickness exceeds 200 Å this metal film 24 becomes costly and excessively high in the reflecting capability. It is preferred that the Ag or Cu film 24 has a thickness ranging from 50 to 150 Å. When it is desired to augment the heat-reflecting power of the coating 20 it is better to provide another Ag or Cu film as described hereinafter than to greatly increase the thickness of the Ag or Cu film 24 shown in FIG. 1, because the former measure has merits such as less lowering of the transmitance of the coating for visible light and better characteristics of each Ag or Cu film.

The thickness of the Zn film 26 is limited within the range from 20 to 200 Å. If the thickness is less than 20 Å the Zn film 26 is insufficient in the function of preventing the appearance of spot-like defects in the coating 20 by agglomerative oxidation of the underlying silver or copper. The defect preventing effect of the Zn film 26 does not significantly augment even though the film 26 is made thicker than 200 Å, and such an increase in the film thickness results in lowering of the transmittance for visible light. A very suitable range of the thickness of the Zn film 26 is from 30 to 150 Å, and a preferred range is from 50 to 100 Å.

The thickness of the outer protective film 28 of ITO or AlN is not strictly limited. Usually this film 28 is deposited to a thickness of about 100 to about 1000 Å.

Usually the multilayer coating 20 is formed over the entire surface area of the glass plate 10. However, considering the moisture resistance of the coating 20 it is preferable to make the Ag or Cu film 24 slightly narrower than the other films 22, 26, 28 so as to leave a narrow margin along every edge of the glass plate 10.

Figure 2:
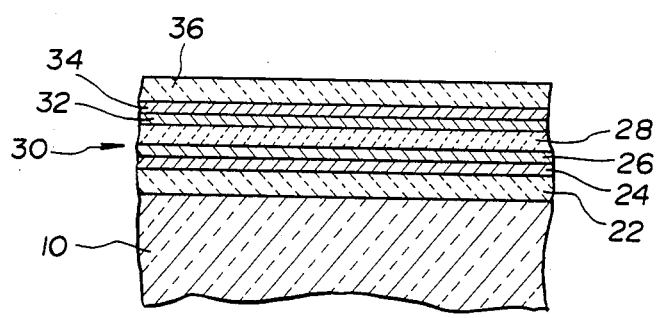
FIG. 2 shows, in a similar view, modification of the coating of FIG. 1 into a seven-layer coating as another embodiment of the invention.

FIG. 2 shows a heat-reflective seven-layer coating 30 according to the invention. This coating 30 is formed by overlaying the four-layer coating 20 of FIG. 1 first with a reflective metal film 32 of Ag or Cu, then with a metallic Zn film 34 and finally with a protective film 36 of ITO or AlN. The Ag or Cu film 32 has a thickness ranging from 40 to 200 Å, and the Zn film 34 has a thickness ranging from 20 to 200 Å. The thickness of the outermost ITO or AlN film 36 is not strictly limited, though it is usually from about 100 to about 1000 Å.

According to the need, the seven-layer coating 30 of FIG. 2 can be further modified into a ten-layer coating by adding three layers similar to the upper three layers 32, 34, 36 in FIG. 2. If desired a coating having a still larger number of layers may be formed by further adding the combination of the three layers 32, 34, 36 in FIG. 2.

For either of the coating 20 of FIG. 1 and the coating 30 of FIG. 2 it is optional to overlay the outermost ITO or AlN film 28 or 36 with a supplementary protective film of, for example, TiN, CrN, $SiAlN_x$, $SiO_2$ or $TiO_2$.

EXAMPLE 1

In this example a four-layer coating shown in FIG. 1 was formed on a 600 mm square and 3.0 mm thick plate of a transparent and colorless glass (FL3). The glass plate exhibited a transmittance of about 89.5% for visible light.

The glass plate was washed with a neutral detergent, rinsed with water and further with isopropyl alcohol and dried. Then the glass plate was set horizontally on a carrier movably installed in a vacuum chamber of a DC magnetron reactive sputtering apparatus. The carrier was reciprocatively movable so as to be positioned alternately above a target of $In_2O_3$—$SnO_2$ (5 wt %), a target of pure Ag and a target of pure Zn. The chamber was depressurized to the extent of about $5 \times 10^{-6}$ Torr, and then argon gas containing 1% of oxygen was introduced into the vacuum chamber to maintain the degree of vacuum at $3 \times 10^{-3}$ Torr. Under such condition the ITO target was sputtered at a power of about 2 kW while the glass plate was horizontally moved in a region above the ITO target at a costant speed of about 400 mm/min. As the result an ITO film having a thickness of about 400 Å was deposited on the glass plate.

Then the feed of the argon gas was stopped, and the vacuum chamber was depressurized to the extent of about $5 \times 10^{-6}$ Torr while the glass plate was kept in the chamber, and then argon gas containing 1 wt % of oxygen was introduced into the chamber to maintain the degree of vacuum at about $3 \times 10^{-3}$ Torr. Under such condition the glass plate was transferred to a region above the Ag target, and the Ag target was sputtered at a power of about 700 W while the glass plate was horizontally moved at a constant rate of about 1500 mm/min. As the result a Ag film having a thickness of about 100 Å was deposited on the ITO film on the glass plate.

The feed of the argon gas was stopped, and the vacuum chamber was depressurized to the extent of about $5 \times 10^{-6}$ Torr while the glass plate was kept in the chamber, and then argon gas was introduced to keep the degree of vacuum at about $3 \times 10^{-3}$ Torr. Under such condition the glass plate was transferred to a region above the Zn target, and the Zn target was sputtered at a power of about 600 W while the glass plate was horizontally moved at a constant rate of about 3000 mm/min. As the resut a Zn film having a thickness of about 20 Å was deposited on the precedingly formed Ag film.

Then the feed of the argon gas was stopped, and the degree of vacuum was brought to about $5 \times 10^{-6}$ Torr, and then the initial operation of sputtering ITO was repeated to thereby deposit an ITO film having a thickness of about 400 Å on the precedingly formed Zn film.

By the above process a four-layer coating was formed on one surface of the glass plate. The thickness of each layer of the coating was measured with usual instruments including a surface roughness tester, DEKTAK 3030 of SLOAN Co., and the metallicness of the Zn film was confirmed by elementary analysis of etched surfaces by Auger electron spectroscopy (AES). Several samples were prepared by the same process and under the same conditions.

On the samples of the coated glass plate the transmittance and reflectance for visible light (380–780 nm) were measured with an automatic recording spectrophotometer (Type 340 of Hitachi Seisakusho Co.) by the method according to JIS R 3106, and heat emissivity was determined by the method according to JIS R 3106 by measuraing reflectance in the infrared region (2.5–25 $\mu$m) with an infrared spectophotometer (Type 270-30 of Hitachi Seisakusho Co.). As a moisture resistance test, some samples were left standing in a chamber maintained at a temperature of about 30° C. and relative humidity of about 80%, and on each sample the number of spot-like defects larger than about 0.3 mm in diameter per 30 cm$^2$ of surface area was measured after the lapse of 2 days, 3 days, 4 days and 7 days. The results are shown in the following table together with the results obtained in the following examples and comparative examples.

As can be seen in the table, the coated glass plate was very satisfactory in its optical characteristics with respect to visible light and heat-reflecting and low-emissivity characteristics. Furthermore, the heat-reflective coating exhibited very good resistance to moisture: under the severe test condition the coating remained almost defectless for 3 days. From the result of the moisture resistance test it is evident that when the coating of this example is applied to glass plates each of which is to be used in producing a laminated glass or insulated glass, the coated glass plates can be stored without problem until the laminating or assembling operation. Such storability is very favorable for both the quality of the final products and the productivity of the manufacturing process.

EXAMPLES 2–5

The coating process of Example 1 was repeated except that the thickness of the Zn film was varied as shown in the table by varying the speed of the horizontal movement of the glass plate during the Zn sputtering operation. The speed was about 2000 mm/min in Example 2 (Zn film thickness: about 30 Å), about 1500 mm/min in Example 3 (Zn film thickness: about 40 Å), about 1000 mm/min in Example 4 (Zn film thickness: about 60 Å) and about 600 mm/min in Example 5 (Zn film thickness: about 100 Å).

As shown in the table, the coated glass plates of Examples 2–5 had nearly the same characteristics as the coated glass plate of Example 1, though as a natural consequence the moisture resistance of the multilayer coating improved as the thickness of the Zn film increased.

EXAMPLES 6 AND 7

The multilayer coating of Example 1 was modified by replacing each of the two ITO films by an AlN film having a thickness of about 400 Å and by increasing the thickness of the Zn film to about 40 Å in Example 6 and about 100 Å in Example 7. Otherwise, the process of Example 1 was repeated. Each AlN film was deposited in the DC magnetron reactive sputtering apparatus mentioned in Example 1 by using an Al target and N$_2$ gas. After depressurizing the vacuum chamber to the extent of about $5\times10^{-6}$ Torr, nitrogen gas introduced into the chamber together with argon gas (flow rate ratio of Ar to N$_2$ was from 0:1 to 1:1) to maintain the degree of vacuum at about $2\times10^{-3}$ Torr. Under such condition the Al target was sputtered at a power of about 2 kW while the glass plate above the target was horizontally moved at a constant speed of about 94 mm/min.

As shown in the table, the multilayer coatings of Examples 6 and 7 had nearly the same characteristics as the coatings of Examples 2–5.

Examples 1–7 were supplemented by replacing the Ag film by a Cu film to confirm that nearly similarly good heat-reflecting characteristics and moisture resistance can be gained.

In the foregoing examples a DC magnetron reactive sputtering apparatus was used to form the multilayer coating, but this is not limitative, and it is free to use an alternative apparatus such as, for example, high-frequency (RF) sputtering apparatus.

|  | Film Thickness (Å) | | | | Transmittance (%), visible light | Reflectance (%), visible light | | Heat Emissivity | Moisture Resistance (number of spot-like defects per 30 cm$^2$ square) | | | |
|---|---|---|---|---|---|---|---|---|---|---|---|---|
|  | 1st layer (ITO) | 2nd layer (Ag) | 3rd layer (Zn) | 4th layer (ITO) |  | uncoated side | coated side |  | after 2 days | after 3 days | after 4 days | after 5 days |
| Example 1 | 400 | 100 | 20 | 400 | 86 | 5.1 | 3.5 | 0.1 | 0 | 2 | 8 | 40 |
| Example 2 | 400 | 100 | 30 | 400 | 85 | 5.5 | 3.5 | 0.1 | 0 | 0 | 3 | 20 |
| Example 3 | 400 | 100 | 40 | 400 | 83 | 6.3 | 3.7 | 0.1 | 0 | 0 | 2 | 18 |
| Example 4 | 400 | 100 | 60 | 400 | 80 | 6.0 | 4.1 | 0.1 | 0 | 0 | 1 | 15 |
| Example 5 | 400 | 100 | 100 | 400 | 73 | 11.2 | 9.8 | 0.1 | 0 | 0 | 1 | 10 |
| Example 6 | 400 (AlN) | 100 | 40 | 400 (AlN) | 81 | 6.0 | 4.2 | 0.1 | 0 | 0 | 1 | 12 |
| Example 7 | 400 (AlN) | 100 | 100 | 400 (AlN) | 74 | 11.0 | 9.8 | 0.1 | 0 | 0 | 1 | 8 |
| Comp. Ex. 1 | 400 | 100 | — | 400 | 83 | 5.0 | 3.5 | 0.1 | 17 | 25 | 40 | 150 |
| Comp. Ex. 2 | 400 | 100 | 15 | 400 | 83 | 5.1 | 3.5 | 0.1 | 3 | 8 | 19 | 60 |
| Comp. Ex. 3 | 400 (ZnO) | 100 | 10 | 400 (ZnO) | 85 | 8.1 | 7.0 | 0.1 | 80 | 120 | 150 | ∞ |
| Comp. Ex. 4 | 400 (ZnO) | 100 | 20 | 400 (ZnO) | 84 | 10.3 | 7.9 | 0.1 | 35 | 60 | 100 | ∞ |
| Comp. Ex. 5 | 400 | 100 | 30 | 400 | 83 | 11.9 | 9.4 | 0.1 | 25 | 43 | 80 | ∞ |

| Film Thickness (Å) | | | | Transmittance (%), visible light | Reflectance (%), visible light | | Heat Emissivity | Moisture Resistance (number of spot-like defects per 30 cm² square) | | | |
|---|---|---|---|---|---|---|---|---|---|---|---|
| 1st layer (ITO) (ZnO) | 2nd layer (Ag) | 3rd layer (Zn) | 4th layer (ITO) (ZnO) | | uncoated side | coated side | | after 2 days | after 3 days | after 4 days | after 5 days |

-continued

COMPARATIVE EXAMPLES 1 AND 2

The multilayer coating of Example 1 was modified only in respect of the Ag film: in Comparative Example 1 the Ag film was omitted to form a three-layer coating, and in Comparative Example 2 the thickness of the Ag film was reduced to 15 Å.

As shown in the table, the omission of the Zn film or the reduction in the thickness of the Zn film had little influence on the optical characteristics and low heat emissivity of the coated glass plate, but the modified multilayer coatings were inferior in moisture resistance. The results of the moisture resistance test indicate that the coated glass plates of these comparative examples have to be stored and handled with scrupulous care and, nevertheless, might raise problems about quality.

COMPARATIVE EXAMPLES 3-5

The multilayer coating of Example 1 was modified by replacing each of the two ITO films by a ZnO film having a thickness of about 400 Å. Besides, the thickness of the Zn film was reduced to about 10 Å in Comparative Example 3 and increased to about 30 Å in Comparative Example 5. Otherwise, the process of Example 1 was repeated. Each ZnO film was deposited in the DC magnetron reactive sputtering apparatus mentioned in Example 1 by using a Zn target and $O_2$ gas. After depressurizing the vacuum chamber to the extent of about $5 \times 10^{-6}$ Torr, oxygen gas introduced into the chamber together with argon gas (flow rate ratio of Ar to $O_2$ was from 0.1:1 to 1:1) to maintain the degree of vacuum at about $2 \times 10^{-3}$ Torr. Under such condition the Zn target was sputtered at a power of about 0.8 kW while the glass plate above the target was horizontally moved at a constant speed of about 80 mm/min.

As shown in the table, the multilater coatings of these comparative examples were very inferior in moisture resistance. Considering from the test results, it will be difficult to store glass plates provided with an equivalent coating in preparation for the manufacture of laminated glass or insulated glass.

What is claimed is:

1. A heat reflecting glass plate, comprising a transparent glass plate and a multilayer coating formed on one side of the glass plate, the multilayer coating comprising:
    a base layer which is a film of a protective material selected from the group consisting of indium-tin oxide and AlN deposited on the glass plate surface;
    a first heat reflective layer which is a film of a metal selected from the group consisting of Ag and Cu deposited on said base layer and has a thickness in the range from 40 to 200 Å;
    a first barrier layer which is a metal Zn film deposited on said first heat reflective layer and has a thickness in the range from 20 to 200 Å;
    a first protective layer which is a film of said protective material deposited on said first barrier layer;
    a second heat reflective layer which is a film of said metal selected from the group consisting of Ag and Cu deposited on said first protective layer and has a thickness in the range from 40 to 200 Å;
    a second barrier layer which is a metal Zn film deposited on said second heat reflective layer and has a thickness in the range from 20 to 200 Å; and
    a second protective layer which is a film of said protective material deposited on said second barrier layer.

2. A heat reflecting glass plate according to claim 1, wherein the thickness of each of said first and second heat reflective layers is in the range from 50 to 150 Å.

3. A heat reflecting glass plate according to claim 1, wherein the thickness of each of said first and second barrier layers is in the range from 50 to 100 Å.

4. A heat reflecting glass plate according to claim 1, wherein said transparent glass plate is an inorganic glass plate.

5. A heat reflecting glass plate according to claim 1, wherein said transparent glass plate is an organic glass plate.

6. A heat reflecting glass plate, comprising a transparent glass plate and a multilayer coating formed on one side of the glass plate, the multilayer coating comprising:
    a base layer which is a film of a protective material selected from the group consisting of indium-tin oxide and AlN deposited on the glass plate surface;
    a heat reflective layer which is a film of a metal selected from the group consisting of Ag and Cu deposited on said base layer and has a thickness in the range from 40 to 200 Å;
    a barrier layer which is a metal Zn film deposited on said heat reflective layer and has a thickness in the range from 20 to 200 Å; and
    a protective layer which is a film of said protective material,
    wherein said heat reflective layer is smaller in surface area than the other layers such that only in a peripheral region of the glass plate said barrier layer makes direct contact with said base layer.

7. A heat reflecting glass plate, comprising a transparent glass plate and a four-layer coating formed on one side of the glass plate, the four-layer coating comprising:
    a base layer which is an AlN film deposited on the glass plate surface;
    a heat reflective layer which is a film of a metal selected from the group consisting of Ag and Cu deposited on said base layer and has a thickness in the range form 40 to 200 Å;
    a barrier layer which is a metal Zn film deposited on said heat reflective layer and has a thickness in the range from 20 to 200 Å; and
    a protective layer which is an AlN film deposited on said barrier layer.

8. The heat reflecting glass plate of claim 7, wherein the thickness of said heat reflective layer is in the range from 50 to 150 Å.

9. The heat reflecting glass plate of claim 7, wherein the thickness of said barrier layer is in the range from 50 to 100 Å.

10. The heat reflecting plate of claim 7, wherein said transparent glass plate is an inorganic glass plate.

11. The heat reflecting plate of claim 7, wherein said transparent glass plate is an organic glass plate.

* * * * *